(12) United States Patent
Li et al.

(10) Patent No.: US 12,438,454 B2
(45) Date of Patent: Oct. 7, 2025

(54) MILLIMETER WAVE-BASED SWITCHING POWER SUPPLY

(71) Applicant: DECO INTEGRATION TECHNOLOGY CO., LIMITED, Shenzhen (CN)

(72) Inventors: Cheng Li, Shenzhen (CN); Weinian Liang, Shenzhen (CN)

(73) Assignee: DECO LNTEGRATION TECHNOLOGY CO., LIMITED, Shenzhen (CN)

( * ) Notice: Subject to any disclaimer, the term of this patent is extended or adjusted under 35 U.S.C. 154(b) by 206 days.

(21) Appl. No.: 18/453,982

(22) Filed: Aug. 22, 2023

(65) Prior Publication Data

US 2024/0128862 A1   Apr. 18, 2024

Related U.S. Application Data

(63) Continuation of application No. PCT/CN2023/089745, filed on Apr. 21, 2023.

(30) Foreign Application Priority Data

Oct. 12, 2022   (CN) .......................... 202222682491.5

(51) Int. Cl.
*H02M 3/335* (2006.01)
*H02M 1/00* (2007.01)
(Continued)

(52) U.S. Cl.
CPC ......... *H02M 3/015* (2021.05); *H02M 1/0025* (2021.05); *H02M 1/44* (2013.01); *H02M 3/33523* (2013.01)

(58) Field of Classification Search
CPC ......... H02M 3/33553; H02M 3/33571; H02M 3/33523; H04B 1/10; H04B 1/0007; H04B 1/0458; H04B 1/0475
See application file for complete search history.

(56) References Cited

U.S. PATENT DOCUMENTS 11,611,364 B1 * 3/2023 Li .......................... H04B 1/0458
2013/0102357 A1 * 4/2013 Vance ................... H04M 1/0202
343/857
2016/0373015 A1 * 12/2016 Deng .................. H02M 3/3376

FOREIGN PATENT DOCUMENTS

CN   110416974 A   11/2019
CN   113224948 A   8/2021
(Continued)

*Primary Examiner* — Sisay G Tiku
(74) *Attorney, Agent, or Firm* — Nitin Kaushik

(57) ABSTRACT

Disclosed is a millimeter wave-based switching power supply, including an input voltage circuit, an upper bridge inductor-inductor-capacitor (LLC) circuit and a lower bridge LLC circuit of a primary winding of a transformer, a millimeter wave switch control chip, and an output voltage circuit, where the upper bridge LLC circuit includes a first capacitor C1, an inductor L1, and an input end and an output end of the millimeter wave switch control chip; and the lower bridge LLC circuit includes a second capacitor C2, the inductor L1, and the output end and an earthing terminal of the millimeter wave switch control chip. By taking millimeter waves as a short distance transmission mode of carrier waves, either wireless transmission or signal isolation can be achieved through an antenna without an optocoupler and an extra isolation layer, so that high signal transmission speed, small delay and high efficiency can be guaranteed.

6 Claims, 7 Drawing Sheets

(51) Int. Cl.
*H02M 1/44* (2007.01)
*H02M 3/00* (2006.01)

(56) References Cited

FOREIGN PATENT DOCUMENTS

| | | | | |
|---|---|---|---|---|
| CN | 114123724 A | | 3/2022 | |
| CN | 106603091 B | * | 11/2022 | ............... H03D 7/16 |
| CN | 115378468 A | * | 11/2022 | .............. H02M 1/08 |
| CN | 218633715 U | * | 3/2023 | |
| CN | 116683775 A | * | 9/2023 | ................ H02J 7/06 |
| CN | 220822907 U | * | 4/2024 | |

* cited by examiner

MILLIMETER WAVE-BASED SWITCHING POWER SUPPLY

CROSS-REFERENCE TO RELATED APPLICATIONS

The application claims priority to Chinese patent application No. 202222682491.5, filed on Oct. 12, 2022, the entire contents of which are incorporated herein by reference.

TECHNICAL FIELD

The present application relates to the technical field of switching power supplies, and particularly relates to a millimeter wave isolator chip-based switching power supply.

BACKGROUND

A switching power supply is a high-frequency electric energy conversion device, which usually converts an inputted alternating current power supply into a direct current power supply in a special form, so as to charge loading equipment. The operating power of a power supply transformer is controlled by controlling closing and turning off of a switch, so as to satisfy requirements of different power circuits. The switching power supply is widely applied to the fields of automation control, military equipment, research equipment, LED illumination, industrial control equipment, communication equipment, power equipment, and the like.

A high power switching power supply is usually of a half-bridge or full-bridge topological structure. A capacitor isolator or a coil isolator is often used for logic control and feedback. A capacitive circuit needs a special oxide layer material, and a coil circuit has the problems of area, and the like. With extensive use of the third generation semiconductor in the high power switching power supply, a higher requirement is put on the efficiency, and the switching power supply features lower delay to achieve signal logic control processing. As the switching frequency is increasingly high, it is inevitable that the capacitive isolator or the coil isolator is made smaller and smaller with smaller and smaller separation distance, so that the isolation requirement cannot be satisfied. Just because of a characteristic relation between frequency, and capacitance and inductance, design of the switching power supply encounters the bottleneck and is hardly broken through upwards. To design a high power switching power supply with high frequency becomes a problem needed to be solved.

SUMMARY

The present application provides a millimeter wave-based switching power supply, which controls efficient transmission of high frequency signals by means of a transmission characteristic of millimeter wave signals to satisfy efficient and rapid work of the switching power supply, thereby solving the problems that an existing half-bridge switching power supply features poor transient control, low work efficiency, limitation by frequency, and the like.

To solve the abovementioned technical problems, the present application adopts the following technical solution:

A millimeter wave-based switching power supply, including an input voltage circuit, an upper bridge inductor-inductor-capacitor (LLC) circuit and a lower bridge LLC circuit of a primary winding of a transformer, a millimeter wave switch control chip, and an output voltage circuit, where the upper bridge LLC circuit includes a first capacitor C1, an inductor L1, and an input end and an output end of the millimeter wave switch control chip; and the lower bridge LLC circuit includes a second capacitor C2, the inductor L1, and the output end and an earthing terminal of the millimeter wave switch control chip;

an output end of the input voltage circuit is respectively connected to a first end of the first capacitor C1 and the input end of the millimeter wave switch control chip;

the output end of the millimeter wave switch control chip is connected to a first end of the inductor L1;

a second end of the inductor L1 is connected to a first end of the primary winding of the transformer;

a second end of the first capacitor C1 is respectively connected to a first end of the second capacitor C2 and a second end of the primary winding of the transformer; and a second end of the second capacitor C2 and the earthing terminal of the millimeter wave switch control chip are respectively connected to the ground.

The present application has the following beneficial effects: based on an application of the millimeter wave isolator chip to the half-bridge switching power supply, by taking millimeter waves as the short distance transmission mode of carrier waves, the bandwidth can reach 100 Kbps to 10 Gbps, so that the speed is high; high frequency transmission can be achieved through the antenna without the optocoupler and extra isolation layer; moreover, even if a product is broken down, a short circuit of a metal is not induced by the antenna, so that signal isolation can be achieved, and therefore, high signal transmission speed, small delay and high efficiency can be guaranteed, while good isolation is achieved, and the millimeter wave-based switching power supply is safer.

DETAILED DESCRIPTION OF THE EMBODIMENTS

In order to describe the technical content, the achieved objective and effect of the present application in detail, description will be made below in combination with implementation modes and in cooperation with drawings.

Figure 1:
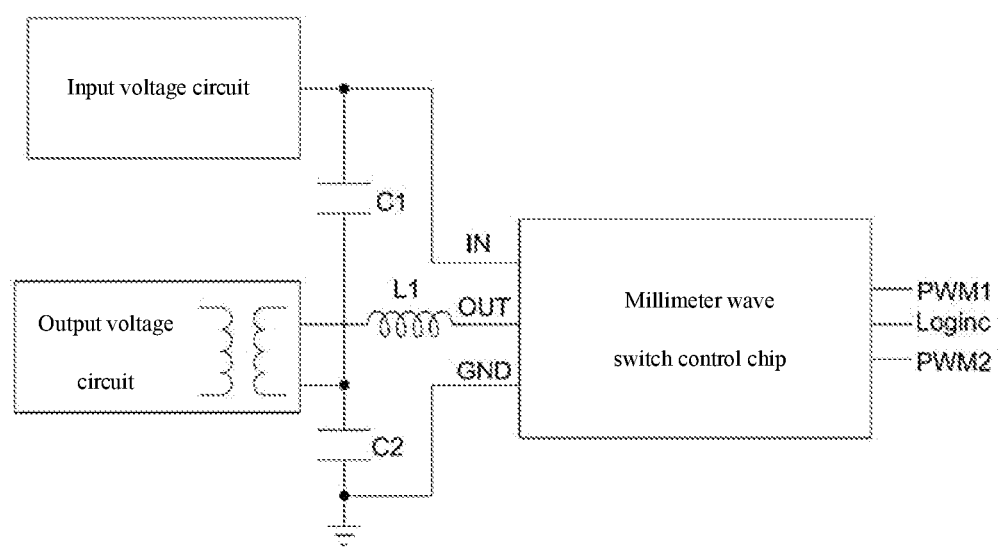
FIG. 1 is a structural schematic diagram of a millimeter wave-based switching power supply provided by an embodiment of the present application.

The above millimeter wave isolator chip of the present application can be applicable to, for example, isolation between a low voltage area circuit and a high voltage area circuit in a high voltage circuit in a high power half-bridge switching power supply, and isolation between a digital logic control circuit and a feedback circuit in the switching power supply, which will be described below through specific embodiments:

in an optional implementation mode, as shown in FIG. 1, a millimeter wave-based switching power supply, including an input voltage circuit, an upper bridge LLC circuit and a lower bridge LLC circuit of a primary winding of a transformer, a millimeter wave switch control chip, and an output voltage circuit, where the upper bridge LLC circuit includes a first capacitor C1, an inductor L1, and an input end and an output end of the millimeter wave switch control chip; and the lower bridge LLC circuit includes a second capacitor C2, the inductor L1, and the output end and an earthing terminal of the millimeter wave switch control chip;

an output end of the input voltage circuit is respectively connected to a first end of the first capacitor C1 and the input end of the millimeter wave switch control chip;

the output end of the millimeter wave switch control chip is connected to a first end of the inductor L1;

a second end of the inductor L1 is connected to a first end of the primary winding of the transformer;

a second end of the first capacitor C1 is respectively connected to a first end of the second capacitor C2 and a second end of the primary winding of the transformer; and a second end of the second capacitor C2 and the earthing terminal of the millimeter wave switch control chip are respectively connected to the ground.

Based on an application of the millimeter wave isolator chip to the half-bridge switching power supply, by taking millimeter waves as the short distance transmission mode of carrier waves, the bandwidth can reach 100 Kbps to 10 Gbps, so that the speed is high; high frequency transmission can be achieved through the antenna without the optocoupler and extra isolation layer. Moreover, even if a product is broken down, a short circuit of a metal is not induced by the antenna, so that signal isolation can be achieved, and therefore, high signal transmission speed, small delay and high efficiency can be guaranteed, while good isolation is achieved, and the millimeter wave-based switching power supply is safer.

Figure 2:
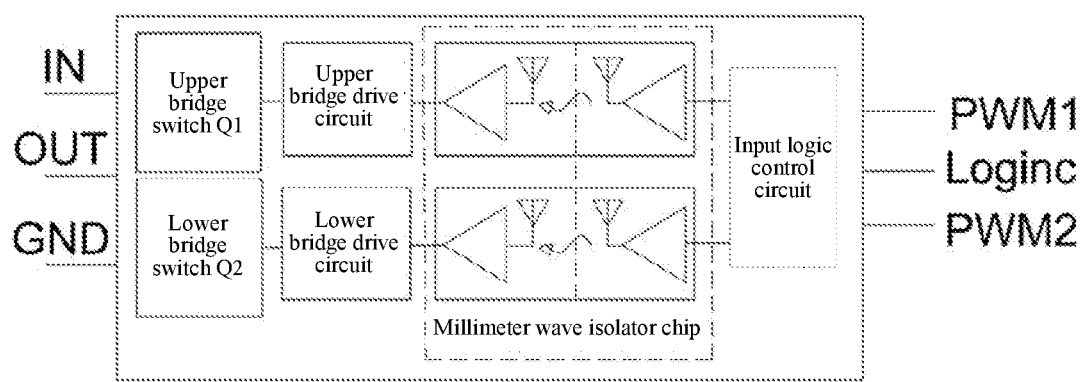
FIG. 2 is a structural schematic diagram of a millimeter wave switch control chip provided by the embodiment of the present application.

As shown in FIG. 2, the millimeter wave switch control chip includes an input logic control circuit, a millimeter wave isolator chip, an upper bridge drive circuit, a lower bridge drive circuit, an upper bridge switch Q1, and a lower bridge switch Q2;

a first input end of the input logic control circuit is connected to an input of a first pulse width modulation signal PWM1, a second input end thereof is connected to an input of a logic control signal Logic, and a third input end thereof is connected to an input of a second pulse width modulation signal PWM2;

a first output end of the input logic control circuit is connected to a first input end of the millimeter wave isolator chip, and a second output end thereof is connected to a second input end of the millimeter wave isolator chip;

a first output end of the millimeter wave isolator chip is connected to an input end of the upper bridge drive circuit, and a second output end thereof is connected to an input end of the lower bridge drive circuit;

an output end of the upper bridge drive circuit is connected to an input end of the upper bridge switch Q1;

an output end of the lower bridge drive circuit is connected to an input end of the lower bridge switch Q2;

a first output end of the upper bridge switch Q1 is connected to the input end of the millimeter wave switch control chip;

a second output end of the upper bridge switch Q1 is respectively connected to a first output end of the lower bridge switch Q2 and the output end of the millimeter wave switch control chip, and a connection point is the output end of the millimeter wave switch control chip; and a second end of the lower bridge switch Q2 is connected to the earthing terminal of the millimeter wave switch control chip.

The millimeter wave switch control chip is a PIP/RF packaged chip. The millimeter wave circuit is applied to a safe isolating circuit. Two PWM signals, i.e., PWM1 and PWM2 signals, of a safe area, and the logic control signal Logic signal are generated by a microcontroller such as MCU executed on a corresponding control program or a charging protocol chip of the switching power supply. When the PWM1, PWM2 and Logic signals are inputted to the input logic control circuit, they are respectively outputted to the millimeter wave isolator chip by way of logic control. The PWM1 signal and the outputted first logic signal Logic1 passing through the millimeter wave isolator chip are outputted and pass through the upper bridge drive circuit, and are outputted to drive the switch Q1; and the PWM2 signal and the outputted second logic signal Logic2 passing through the millimeter wave isolator chip are outputted and pass through the lower bridge drive circuit, and are outputted to drive the switch Q2. The working conditions of the upper bridge switch Q1 and the lower bridge switch Q2 access to the switching power supply are respectively decided by the logic states of the first logic signal Logic1 and the second logic signal Logic2 outputted by the input logic control circuit from the inputted Logic signal. The PWM1 and PWM2 signals respectively control closing and turning off of the upper bridge switch Q1 and the lower bridge switch Q2. By alternately closing the Q1 and Q2, alternating currents in the upper and lower bridge LLC circuits are affected to generate the resonant frequency, which affects the charging power of the output voltage circuit. The working conditions of the upper bridge switch Q1 and the lower bridge switch Q2 are decided by the logic control signal inputted from the safe area. When the working period of one of the switches is started, the other one switch is in the unstarted state. Therefore, high-efficiency work of the half-bridge power supply switch is guaranteed.

In an optional embodiment, the upper bridge switch Q1 and the lower bridge switch Q2 are high power switch semiconductor devices. In an actual switching power supply, when the switch is switched on, the circuit of the switch is the high voltage circuit which needs to bear a large current or large voltage device. In this case, the semiconductor switch can be a field effect transistor, a metal oxide semiconductor field effect transistor (MOSFETs), silicon carbide (SiC), and gallium nitride (GaN).

Figure 3:
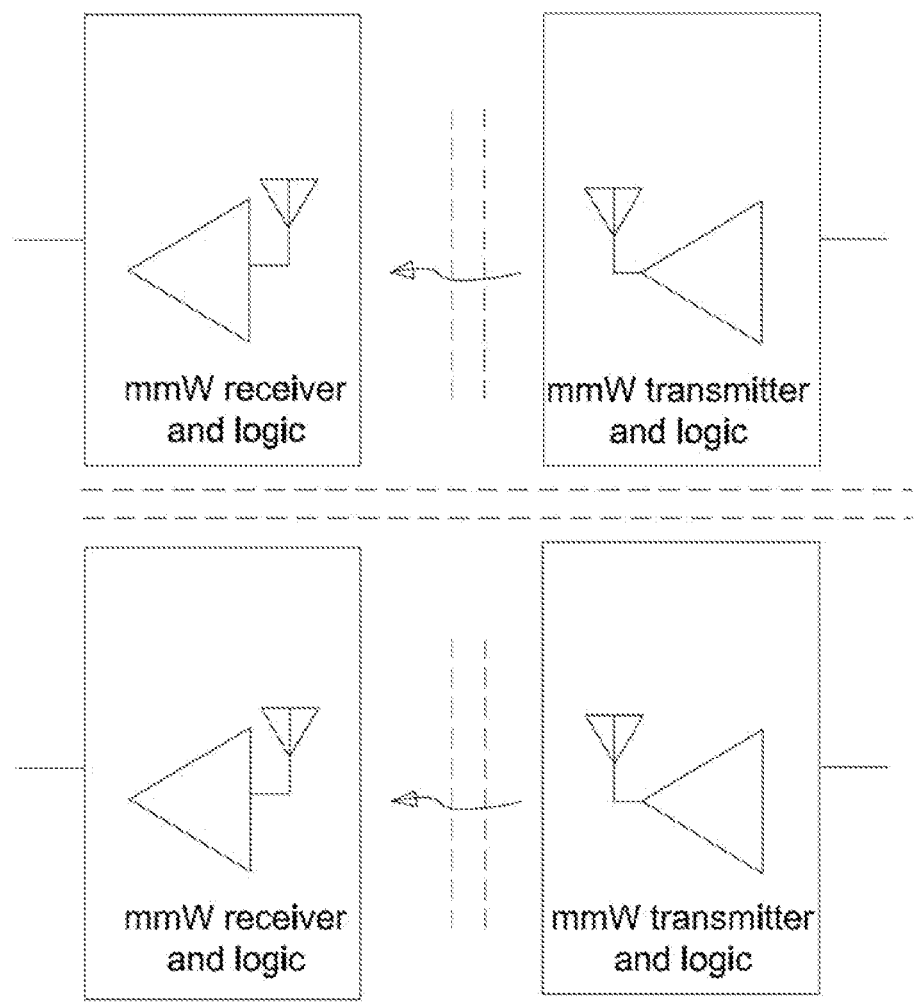
FIG. 3 is a schematic structural diagram of a millimeter wave isolator chip provided by the embodiment of the present application.

In an optional implementation mode, as shown in FIG. 3, the millimeter wave isolator chip is of a structure integrating two millimeter wave isolators, where an input end of the upper bridge millimeter wave isolator is connected to the first output end of the input logic control circuit, and an output end thereof is connected to the input end of the upper bridge drive circuit; and an input end of the lower bridge millimeter wave isolator is connected to the second output end of the input logic control circuit, and an output end thereof is connected to the input end of the lower bridge drive circuit. To guarantee the stability of the circuit, the two millimeter wave isolators are isolators with same structure, and the two millimeter wave isolators are isolated, where the two millimeter wave isolators do not interfere with each other when transmitting the millimeter wave signals therebetween. The two millimeter wave isolators are isolators are applied to the safe isolating circuit.

Figure 4:
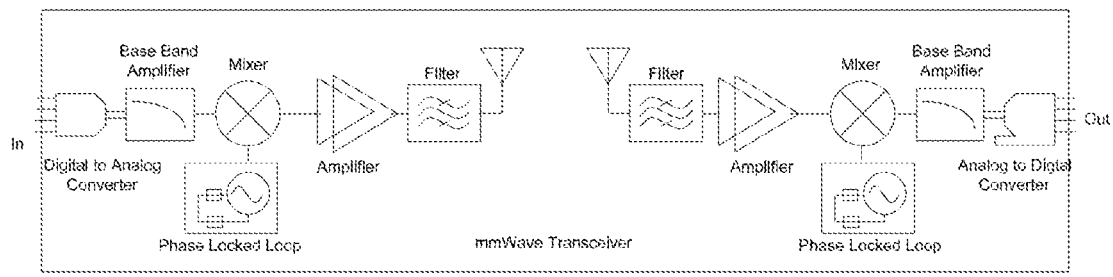
FIG. 4 is a schematic structural diagram of a first circuit of a millimeter wave isolator provided by the embodiment of the present application.

Further, as shown in FIG. 4, the first millimeter wave isolator structurally includes a millimeter wave transmitting end and a millimeter wave receiving end, where the millimeter wave transmitting end includes a digital to analog converter, a first base band amplifier, a first mixer, a first phase locked loop, a first power amplifier, a first filter, and a millimeter wave transmitting antenna; and the millimeter wave receiving end includes a second filter, a second power amplifier, a second mixer, a second phase locked loop, a second base band amplifier, an analog to digital converter, and a millimeter wave receiving antenna. An input end of the digital to analog converter is connected to an input end of the input logic control circuit, and an output end thereof is connected to a first input end of the first mixer; a second input end of the first mixer is connected to an output end of the phase locked loop, and an output end thereof is connected to an input end of the first power amplifier; an output end of the first power amplifier is connected to an input end of the first filter; an output end of the first filter is connected to the millimeter wave transmitting antenna; an input end of the second filter is connected to an output end of the millimeter wave receiving antenna, and an output end thereof is connected to an input end of the second power amplifier; an output end of the second power amplifier is connected to a first input end of the second filter; a second input end of the second mixer is connected to an output end of the second phase locked loop and an output end thereof is connected to an input end of the second base band amplifier; an output end of the second base band amplifier is connected to an input end of the analog to digital converter; and an output end of the analog to digital converter is connected to the input logic control circuit.

Figure 5:
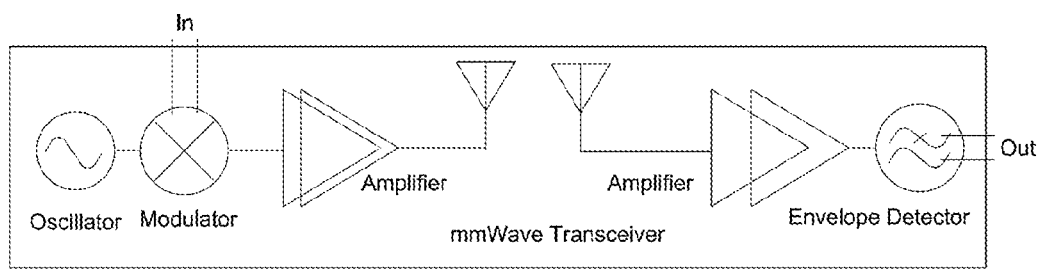
FIG. 5 is a schematic structural diagram of a second circuit of a millimeter wave isolator provided by the embodiment of the present application.

Further, as shown in FIG. 5, the millimeter wave isolator includes a millimeter wave transmitting end and a millimeter wave receiving end, where
the millimeter wave transmitting end includes an oscillator, a modulator, a third power amplifier, and a transmitting antenna;
the millimeter wave receiving end includes a fourth power amplifier, an envelope detector, and a receiving antenna;
an output end of the oscillator is connected to a first input end of the modulator;
a second input end of the modulator is the input end of the millimeter wave isolator, and an output end thereof is connected to an input end of the third power amplifier;
an output end of the third power amplifier is connected to the transmitting antenna;
an input end of the fourth power amplifier is connected to the receiving antenna, and an output end thereof is connected to an input end of the envelope detector; and
an output end of the envelope detector is an output end of the millimeter wave isolator.

In the implementation mode, the pulse width modulation signal and the logic control signal enter the modulator for signal modulation, are amplified and transmitted by the antenna, and the receiving antenna receives the signals, and the signals are then amplified and enter the drive circuit after being detected by the envelope detector.

FIG. 4 and FIG. 5 show the structural diagrams of the above two different millimeter wave isolators. The specific structures of the millimeter wave isolators are not defined in the solution. By taking millimeter waves as carrier waves, the millimeter wave isolators transmitting signals can also be taken as the structures of the millimeter wave isolators. Therefore, design requirements of preventing a high voltage from breaking through the circuit and preventing the components of the circuit from being damaged as a result of too high frequency are met.

Figure 6:
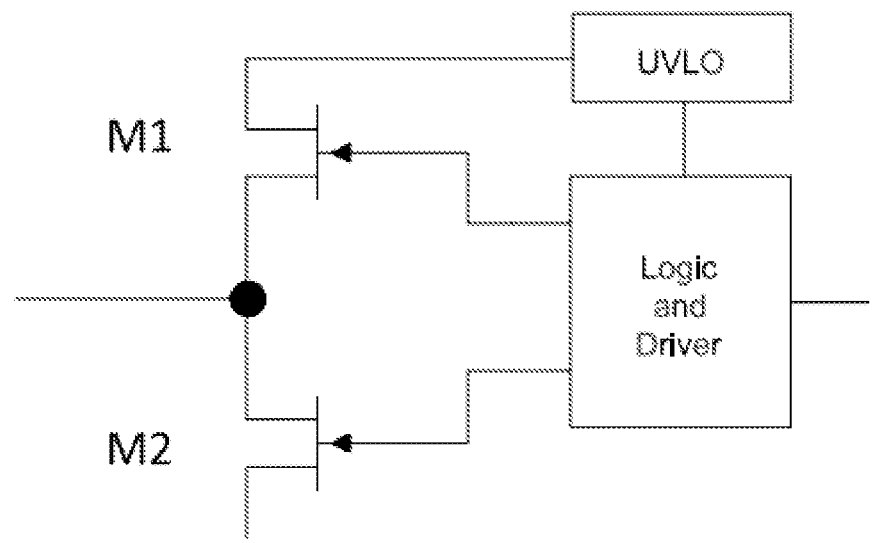
FIG. 6 is a schematic diagram of an upper bridge drive circuit provided by the embodiment of the present application.

In an optional embodiment, the upper bridge drive circuit and the lower bridge drive circuit use a same circuit structure. By taking the upper bridge drive circuit as an example, as shown in FIG. 6, the upper bridge drive circuit includes an undervoltage lockout (UVLO) output undervoltage lockout, an upper bridge logic drive circuit, and a field effect transistor M1 and a field effect transistor M2; a first output end of the upper bridge logic drive circuit is connected to an input end of the field effect transistor M1, and a second output end thereof is connected to an input end of the field effect transistor M2; a first output end of the field effect transistor M1 is connected to an UVLO input end; a second output end of the field effect transistor M1 and a first output end of the field effect transistor M2 are respectively connected to the input end of the upper bridge switch Q1; and a second output end of the field effect transistor M2 is connected to the output end of the millimeter wave switch control chip. The upper bridge logic drive circuit is a microcontroller such as an application-specific integrated circuit (ASIC) or a field-programmable gate array (FPGA) executed on a corresponding control program, to generate logic signals, so as to drive the field effect transistors to execute corresponding operations. The working principle of the lower bridge drive circuit is similar to that of the upper bridge drive circuit. The lower bridge drive circuit includes an UVLO output undervoltage lockout, a lower bridge logic drive circuit, and a field effect transistor M3 and a field effect transistor M4; a first output end of the lower bridge logic drive circuit is connected to an input end of the field effect transistor M3, and a second output end thereof is connected to an input end of the field effect transistor M4; a first output end of the field effect transistor M3 is connected to the UVLO input end; a second output end of the field effect transistor M3 and a first output end of the field effect transistor M4 are respectively connected to the input end of the lower bridge switch Q2; and a second end of the field effect transistor M4 is connected to the earthing terminal of the millimeter wave switch control chip.

Figure 7:
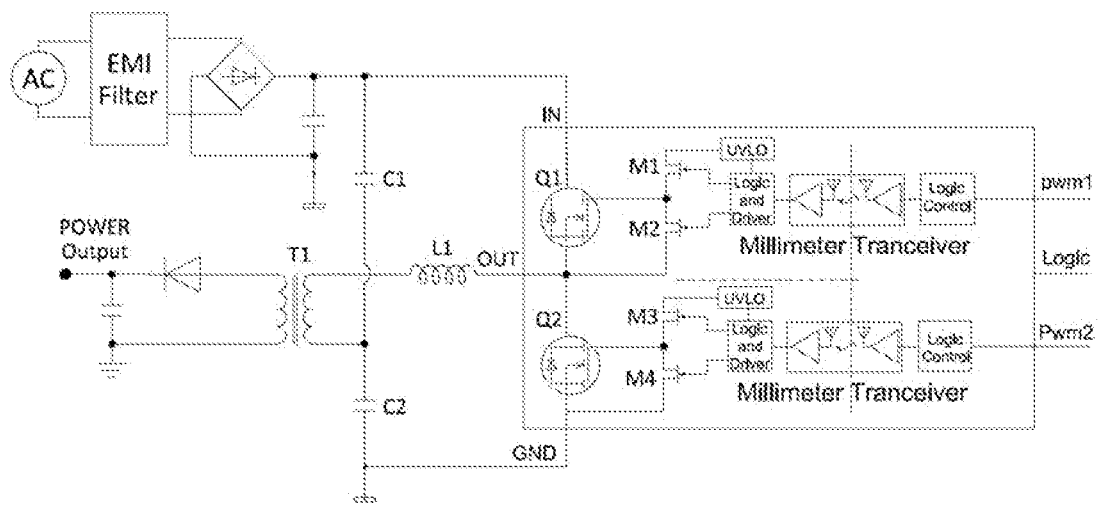
FIG. 7 is a structural schematic diagram of an implementation mode of a millimeter wave-based switching power supply provided by the embodiment of the present application.

In an optional embodiment, as shown in FIG. 7, the input voltage circuit includes a filter circuit, a rectifying circuit, and an energy storage circuit, where an input end of the filter circuit is connected to an alternating current power supply end, and an output end thereof is connected to an input end of the rectifying circuit for filtering an alternating current power supply; an output end of the rectifying circuit is respectively connected to a first end of the energy storage circuit and a second end of a primary coil winding of the charging circuit for rectifying the alternating current power supply so as to output a direct current; and a third end of the rectifying circuit and a second end of the energy storage circuit are respectively connected to the ground. The output voltage circuit includes a primary winding of the transformer, a secondary winding of the transformer, a rectifying diode, and a filter capacitor, where a first end of the primary winding of the transformer is connected to a first end of the rectifying diode, a second end of the rectifying diode is connected to a first end of the filter capacitor, and a second end of the filter capacitor is connected to the ground. The first end and the second end of the filter capacitor serve as the output ends to supply power to a load, thereby achieving voltage output. FIG. 7 shows a structural diagram of a millimeter wave-based switching power supply. The specific structures of the input voltage circuit and the output voltage circuit are not defined in the solution, and the circuit structures achieving the input voltage and the output voltage with the same function can be used.

In conclusion, the present application provides a millimeter wave-based switching power supply. The circuits are isolated by virtue of the millimeter wave transceiver. In the switching circuit of the half-bridge switching power supply, by taking millimeter waves as a short distance transmission mode of carrier waves, the bandwidth can reach 100 Kbps to 10 Gbps with high speed, so that either high frequency transmission or signal isolation can be achieved through the antenna. Moreover, integration can be achieved well by designing the chip without the optocoupler and the extra isolation layer. Productized generation can be performed by adopting a standard CMOS process and a standard packaging process with low generation cost. The product is easily integrated in a consumer product through the standardized packaging process, and moreover, even if the product is broken down, a short circuit of a metal is not induced by the antenna, so that signal isolation can be achieved, and therefore, high signal transmission speed, small delay and high efficiency can be guaranteed, while good isolation is achieved, and the millimeter wave-based switching power supply is safer.

The above is merely the embodiments of the present application rather than limiting the patent scope of the present application. Any equivalent substitution made by means of the contents of the specification and the drawings of the present application is applied to related technical field directly or indirectly, which is, in a similar way, comprised in the protection scope of the patent of the present application.

What is claimed is:

1. A millimeter wave-based switching power supply, comprising an input voltage circuit, an upper bridge inductor-inductor-capacitor (LLC) circuit and a lower bridge LLC circuit of a primary winding of a transformer, a millimeter wave switch control chip, and an output voltage circuit, wherein
the upper bridge LLC circuit comprises a first capacitor C1, an inductor L1, and an input end and an output end of the millimeter wave switch control chip; and the lower bridge LLC circuit includes a second capacitor C2, the inductor L1, and the output end and an earthing terminal of the millimeter wave switch control chip;
an output end of the input voltage circuit is respectively connected to a first end of the first capacitor C1 and the input end of the millimeter wave switch control chip;
the output end of the millimeter wave switch control chip is connected to a first end of the inductor L1;
a second end of the inductor L1 is connected to a first end of the primary winding of the transformer;
a second end of the first capacitor C1 is respectively connected to a first end of the second capacitor C2 and a second end of the primary winding of the transformer; and
a second end of the second capacitor C2 and the earthing terminal of the millimeter wave switch control chip are respectively connected to ground;
wherein the millimeter wave switch control chip comprises an input logic control circuit, a millimeter wave isolator chip, an upper bridge drive circuit, a lower bridge drive circuit, an upper bridge switch Q1, and a lower bridge switch Q2;
a first input end of the input logic control circuit is connected to an input of a first pulse width modulation signal PWM1, a second input end thereof is connected to an input of a logic control signal Logic, and a third input end thereof is connected to an input of a second pulse width modulation signal PWM2;
a first output end of the input logic control circuit is connected to a first input end of the millimeter wave isolator chip, and a second output end thereof is connected to a second input end of the millimeter wave isolator chip;
a first output end of the millimeter wave isolator chip is connected to an input end of the upper bridge drive circuit, and a second output end thereof is connected to an input end of the lower bridge drive circuit;
an output end of the upper bridge drive circuit is connected to an input end of the upper bridge switch Q1;
an output end of the lower bridge drive circuit is connected to an input end of the lower bridge switch Q2;
a first output end of the upper bridge switch Q1 is connected to the input end of the millimeter wave switch control chip;
a second output end of the upper bridge switch Q1 is respectively connected to a first output end of the lower bridge switch Q2 and the output end of the millimeter wave switch control chip; and
a second end of the lower bridge switch Q2 is connected to the earthing terminal of the millimeter wave switch control chip.

2. The switching power supply according to claim 1, wherein the millimeter wave isolator chip is of a structure integrating two millimeter wave isolators, and comprises an upper bridge millimeter wave isolator and a lower bridge millimeter wave isolator;
an input end of the upper bridge millimeter wave isolator is connected to the first output end of the input logic control circuit, and an output end thereof is connected to the input end of the upper bridge drive circuit; and
an input end of the lower bridge millimeter wave isolator is connected to the second output end of the input logic control circuit, and an output end thereof is connected to the input end of the lower bridge drive circuit.

3. The switching power supply according to claim 1, wherein the millimeter wave isolator comprises a millimeter wave transmitting end and a millimeter wave receiving end;
the millimeter wave transmitting end comprises a digital to analog converter, a first base band amplifier, a first mixer, a first phase locked loop, a first power amplifier, a first filter, and a millimeter wave transmitting antenna;
the millimeter wave receiving end comprises a second filter, a second power amplifier, a second mixer, a second phase locked loop, a second base band amplifier, an analog to digital converter, and a millimeter wave receiving antenna;
an input end of the digital to analog converter is connected to an input end of the input logic control circuit, and an output end thereof is connected to a first input end of the first mixer;

a second input end of the first mixer is connected to an output end of the phase locked loop, and an output end thereof is connected to an input end of the first power amplifier;

an output end of the first power amplifier is connected to an input end of the first filter;

an output end of the first filter is connected to the millimeter wave transmitting antenna;

an input end of the second filter is connected to an output end of the millimeter wave receiving antenna, and an output end thereof is connected to an input end of the second power amplifier;

an output end of the second power amplifier is connected to a first input end of the second filter;

a second input end of the second mixer is connected to an output end of the second phase locked loop and an output end thereof is connected to an input end of the second base band amplifier;

an output end of the second base band amplifier is connected to an input end of the analog digital converter; and an output end of the analog to digital converter is connected to the input logic control circuit.

4. The switching power supply according to claim 1, wherein the millimeter wave isolator comprises a millimeter wave transmitting end and a millimeter wave receiving end;

the millimeter wave transmitting end comprises an oscillator, a modulator, a third power amplifier, and a transmitting antenna;

the millimeter wave receiving end comprises a fourth power amplifier, an envelope detector, and a receiving antenna;

an output end of the oscillator is connected to a first input end of the modulator;

a second input end of the modulator is the input end of the millimeter wave isolator, and an output end thereof is connected to an input end of the third power amplifier;

an output end of the third power amplifier is connected to the transmitting antenna;

an input end of the fourth power amplifier is connected to the receiving antenna, and an output end thereof is connected to an input end of the envelope detector; and an output end of the envelope detector is an output end of the millimeter wave isolator.

5. The switching power supply according to claim 1, wherein the upper bridge drive circuit comprises an undervoltage lockout (UVLO) output undervoltage lockout, an upper bridge logic drive circuit, and a field effect transistor M1 and a field effect transistor M2;

a first output end of the upper bridge logic drive circuit is connected to an input end of the field effect transistor M1, and a second output end thereof is connected to an input end of the field effect transistor M2;

a first output end of the field effect transistor M1 is connected to an UVLO input end;

a second output end of the field effect transistor M1 and a first output end of the field effect transistor M2 are respectively connected to the input end of the upper bridge switch Q1; and a second output end of the field effect transistor M2 is connected to the output end of the millimeter wave switch control chip.

6. The switching power supply according to claim 1, wherein the lower bridge drive circuit comprises an UVLO output undervoltage lockout, a lower bridge logic drive circuit, and a field effect transistor M3 and a field effect transistor M4;

a first output end of the lower bridge logic drive circuit is connected to an input end of the field effect transistor M3, and a second output end thereof is connected to an input end of the field effect transistor M4;

a first output end of the field effect transistor M3 is connected to the UVLO input end;

a second output end of the field effect transistor M3 and a first output end of the field effect transistor M4 are respectively connected to the input end of the lower bridge switch Q2; and a second end of the field effect transistor M4 is connected to the earthing terminal of the millimeter wave switch control chip.

* * * * *